United States Patent
Lin

(10) Patent No.: US 9,615,096 B2
(45) Date of Patent: Apr. 4, 2017

(54) DEVICE AND METHOD FOR VIDEO ENCODING

(71) Applicant: HON HAI PRECISION INDUSTRY CO., LTD., New Taipei (TW)

(72) Inventor: Cheng-Long Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 338 days.

(21) Appl. No.: 14/513,959

(22) Filed: Oct. 14, 2014

(65) Prior Publication Data

US 2015/0358625 A1 Dec. 10, 2015

(30) Foreign Application Priority Data

Jun. 4, 2014 (TW) .............................. 103119450 A

(51) Int. Cl.
| | |
|---|---|
| H04N 7/12 | (2006.01) |
| H04N 7/26 | (2006.01) |
| H04N 11/02 | (2006.01) |
| H04N 19/124 | (2014.01) |
| H04N 19/107 | (2014.01) |
| H04N 19/17 | (2014.01) |
| H04N 19/167 | (2014.01) |
| H04N 19/129 | (2014.01) |
| H04N 19/162 | (2014.01) |

(52) U.S. Cl.
CPC ......... *H04N 19/124* (2014.11); *H04N 19/107* (2014.11); *H04N 19/167* (2014.11); *H04N 19/17* (2014.11); *H04N 19/129* (2014.11); *H04N 19/162* (2014.11)

(58) Field of Classification Search
CPC .. H04N 7/12; H04N 7/26; H04N 11/02–11/06
See application file for complete search history.

(56) References Cited

U.S. PATENT DOCUMENTS

| | | | |
|---|---|---|---|
| 7,801,222 B2 | 9/2010 | Seo et al. | |
| 2002/0181583 A1* | 12/2002 | Corbera ............... | H04N 19/176 375/240.03 |
| 2007/0036227 A1* | 2/2007 | Ishtiaq ................. | H04N 19/172 375/240.26 |
| 2011/0268180 A1* | 11/2011 | Srinivasamurthy .. | H04N 19/176 375/240.03 |
| 2014/0355671 A1* | 12/2014 | Peng .................... | H04N 19/115 375/240.03 |
| 2015/0063451 A1* | 3/2015 | Zhu ........................ | H04W 4/18 375/240.09 |

FOREIGN PATENT DOCUMENTS

CN          101742296 A          6/2010

\* cited by examiner

*Primary Examiner* — Behrooz Senfi
*Assistant Examiner* — Maryam Nasri
(74) *Attorney, Agent, or Firm* — Steven M. Reiss

(57) ABSTRACT

A video encoding device calculates number of frames into which the current image needs to be encoded. The video encoding device divides the current image into a plurality of macro blocks, identifies importance of the respective macro blocks according to content of the current image and ranks the macro blocks from high to low according to the assigned importance. The video encoding device labels each macro block with a label, and encodes the macro blocks according to its label to form frames.

10 Claims, 5 Drawing Sheets

DEVICE AND METHOD FOR VIDEO ENCODING

CROSS-REFERENCE TO RELATED APPLICATIONS

This application claims priority to Taiwanese Patent Application No. 103119450 filed on Jun. 4, 2014 in the China Intellectual Property Office, the contents of which are incorporated by reference herein.

FIELD

The present disclosure generally relates to video encoding and decoding.

BACKGROUND

H.264 is a format common in video transmission. The H.264 format comprises intra-coding and inter-coding, where the intra-coding refers to complete encoding, and inter-coding refers to partial encoding. A video frame is divided into a sequence of I frames, P frames and B frames, where each I frame is intra-coded for complete encoding, and where each P frame and B frame are inter-coded.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
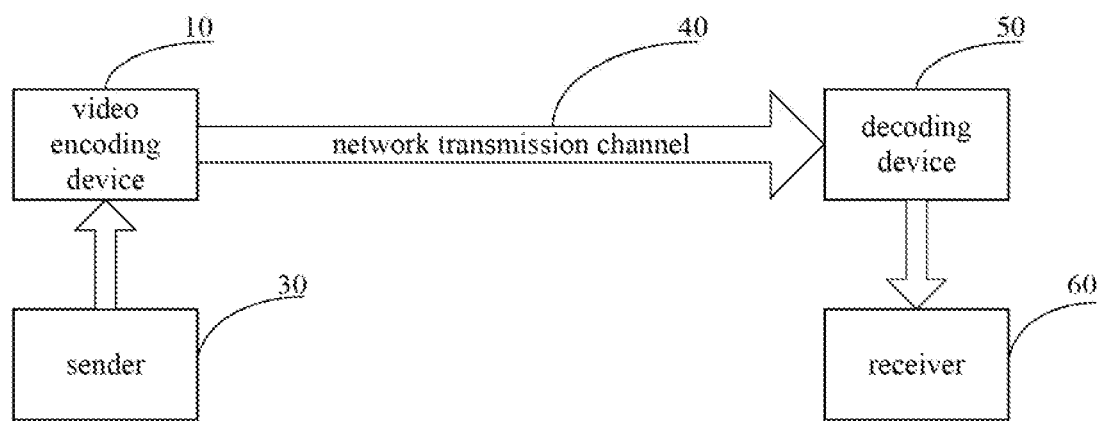
FIG. 1 is a diagrammatic view of an environment of a video coding device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The application is illustrated by way of examples and not by way of limitation in the figures of the accompanying drawings in which like references indicate similar elements.

It should be noted that references to "an" or "one" embodiment in this disclosure are not necessarily to the same embodiment, and such references mean "at least one."

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a diagrammatic view of an environment of the video coding device. In the present embodiment, the video sent by sender 30 is first encoded by video encoding device 10, then transmitted to the decoding device 50 and receiver 60 through the network transmission channel 40. The sender 30 may be a personal computer, a monitor device, or an imaging device. The video encoding device 10 may be located on the sender 30, or may be a separate component. The maximum allowable transmit threshold value of the network transmission channel 40 is $S_{max\text{-}frame}$. The receiver 60 may be a personal computer, a smartphone, or a display device, and the number of the receivers 60 may be more than one. The present disclosure is not limited thereto.

Figure 2:
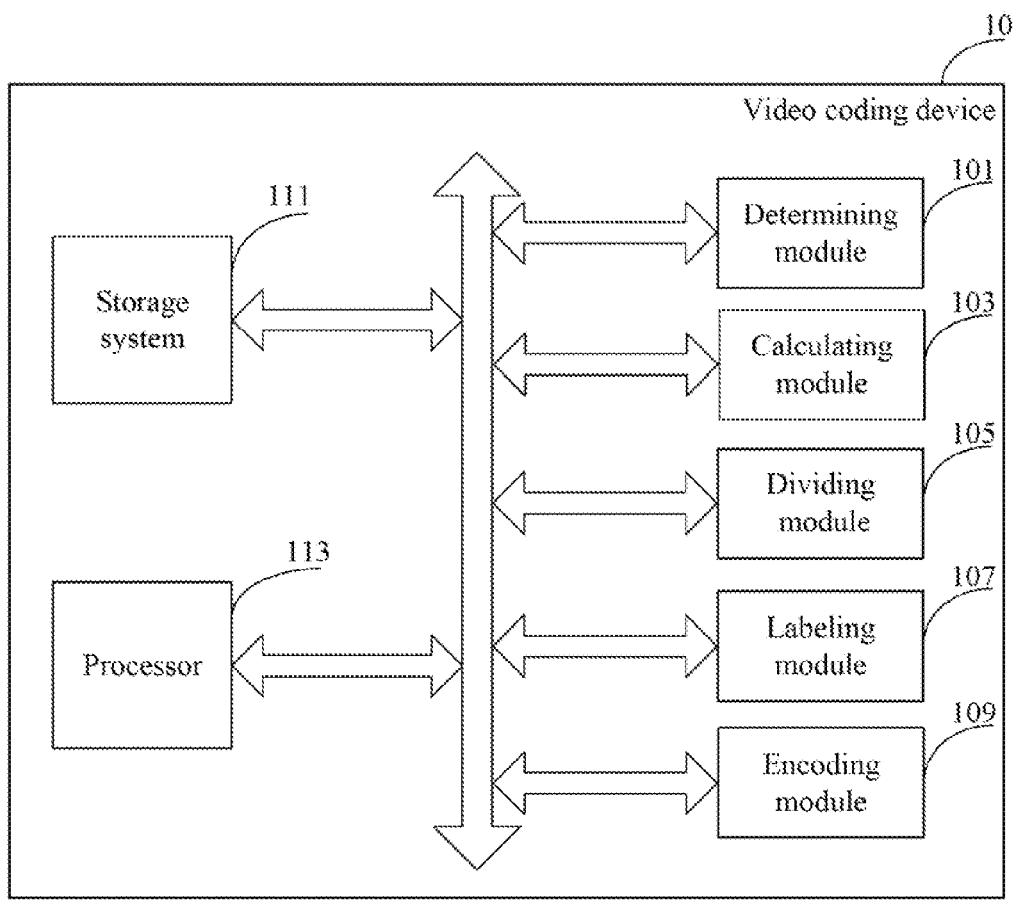
FIG. 2 is a block diagram of one embodiment of the video coding device.

FIG. 2 is a block diagram of one embodiment of the video coding device. The video coding device 10 comprises a determining module 101, a calculating module 103, a dividing module 105, a labeling module 107, a encoding module 109, a storage system 111, and a processor 113. The module 101-109 can include computerized code in the form of one or more programs. The one or more programs are stored in the storage system 111, and the storage system 111 can be a non-transitory memory device. The computerized code includes instructions executed by the processor 113 to provide functions for the modules 101-109.

In the present embodiment, the determining module 101 determines whether to encode current image into I frame. Encoding the current image into I frame is required when the current image has a great or a great number of differences compared to the previous image. Since I frame and P frame are all defined in format H.264, there are other ways to determine whether to encode current image into I frame, the present disclosure is not limited thereto. When encoding of the current image into I frame is needed, the process proceeds to block 303.

In the present embodiment, the calculating module calculates number of frames that the current image needs to be broken down into. Since the network transmission channel 40 has a maximum allowable transmit threshold, a total coding size of the current frame to being larger than the threshold will result in an unclear image, therefore the current image needs to be dispersed into several frames, and calculation of the number of the dispersed frames must be done. The number of the dispersed frames is N, where N is a positive integer starting at one. The calculating module 103 calculates total coding size of the current image when encoding with intra-coding, and compares with the maximum allowable transmit threshold $S_{max\text{-}frame}$. The formula can be $N = \mathrm{ROUND}\{[\mathrm{Max}_{I\text{-}Frame}/(100*k/m*r)]+1\}$, wherein $\mathrm{Max}_{I\text{-}Frame}$ is the total coding size of the current image when encoding with intra-coding, k is transmission rate of the video, m is number of the transmission channels, and r is the frame rate of the video. For instance, if $Max_{I-Frame}$=75 kb, k=8 Mbps, m=1, then it can be calculated that N=3. It indicates that the current image should be dispersed into 3 frames.

In the present embodiment, the dividing module 105 divides the current image into a plurality of macro blocks, and identifies importance of the respective macro blocks according to content of the current image. The number of the macro blocks is M, wherein M is a positive integer starting at one. The dividing module 105 divides the current image into M macro blocks with 8×8 or 16×16 mode. After dividing into macro blocks, the dividing module 105 identifies the content of the current image. Since the image in video usually comprises actors or other significant object, the human character or significant object can be identified by technology of face recognition or object detection. The macro blocks are divided into high importance, into medium importance, and into low importance according to content of the current image. For instance, when there is a face in the current image, the macro blocks of the facial part will be identified as high importance, the macro blocks of the body part will be identified as medium importance, and the macro blocks of the background part will be identified as low importance.

In the present embodiment, the labeling module 107 ranks the macro blocks, from high to low according to the importance and labeling of each macro block, with a label x, wherein x is a positive integer from 1 to N, and x indicates that the macro block will be intra-coded.

In the present embodiment, the encoding module 109 encodes the current image. The encoding module 109 encodes the macro blocks which have a label x equaling 1 with low QP value and intra-coding and the macro blocks which have label x greater than 1 with high QP value and intra-coded to form a first frame. Moreover, the encoding module 109 encodes the macro blocks with label x of less than n with inter-coding to form an $n^{th}$ frame, wherein n is a positive integer from 2 to N. In the present embodiment, the high QP value can be between 22-51, and the low QP value can be between 0-24, and the QP value can be set according to the actual environment.

Figure 3:
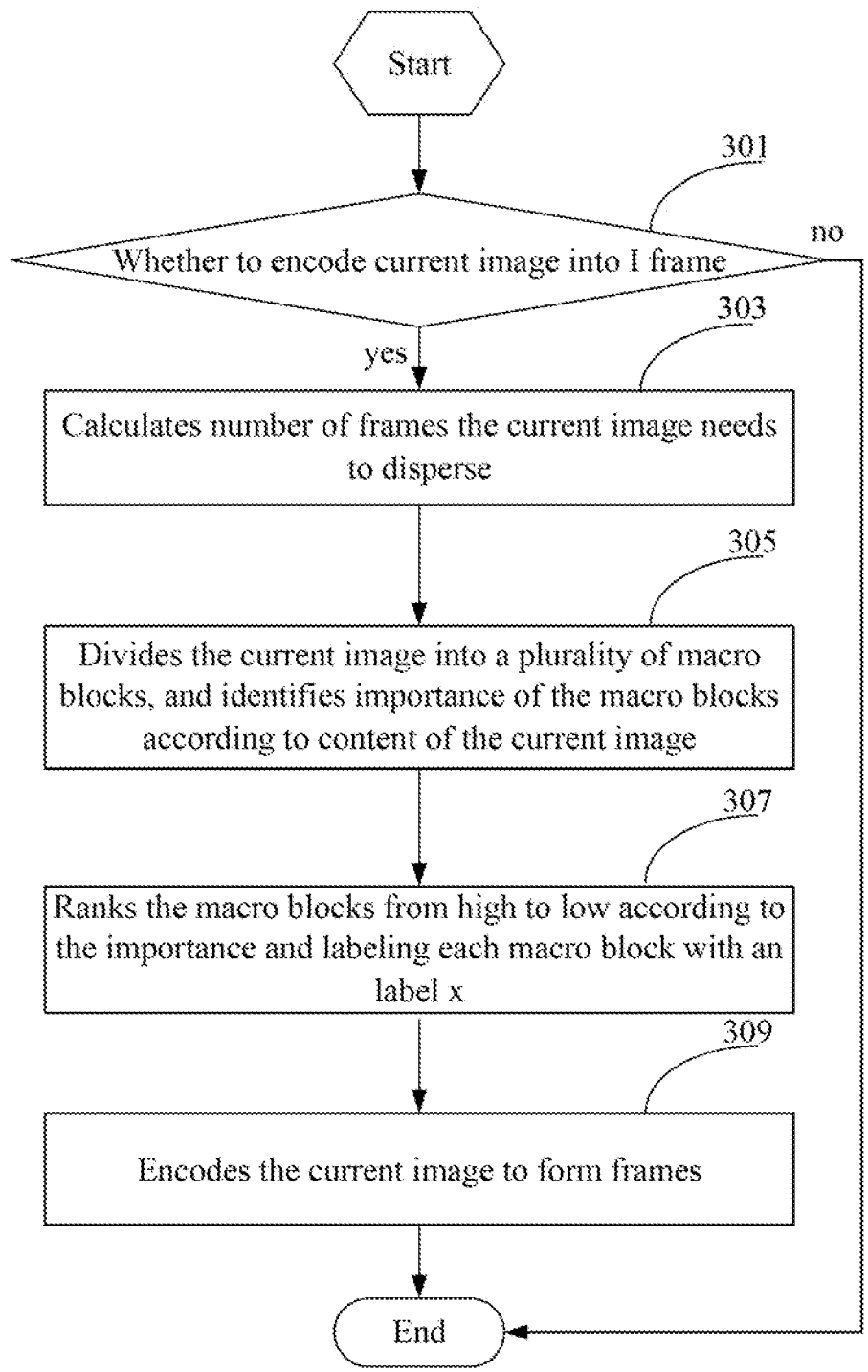
FIG. 3 is a flowchart of one embodiment of a method for video coding.

FIG. 3 is a flowchart of one embodiment of a method for video coding. In one embodiment, the method functions by the modules in FIG. 2 in the following manner.

In block 301, the determining module 101 determines whether to encode current image into I frame. In the present embodiment, encoding of the current image into I frame is needed when the current image has a great or a great number of differences compared to the previous image. Since I frame and P frames are all defined in format H.264, there are also other ways to determine whether to encode current image into I frame, the present disclosure is not limited thereto. When encoding of the current image into I frame is needed, the process proceeds to block 303.

In block 303, the calculating module calculates number of frames into which the current image needs to be dispersed. In the present embodiment, the number of the dispersed frames is N, where N is a positive integer starting at one. The calculating module 103 calculates total coding size of the current image when encoding with intra-coding, and compares with the maximum allowable transmit threshold $S_{max-frame}$. The formula can be $N=ROUND\{[Max_{I-Frame}/(100*k/m*r)]+1\}$, wherein $Max_{I-Frame}$ is the total coding size of the current image when encoding with intra-coding, k is transmission rate of the video, m is the number of the transmission channels, and r is the frame rate of the video.

In block 305, the dividing module 105 divides the current image into a plurality of macro blocks, and identifies importance of the macro blocks according to content of the current image. In the present embodiment, the number of the macro blocks is M, wherein M is a positive integer starting at one. The dividing module 105 divides the current image into M macro blocks with 8×8 or 16×16 mode. After dividing into macro blocks, the dividing module 105 identifies the content of the current image. The macro blocks are divided into high importance, medium importance, and low importance according to content of the current image. For instance, when there is a face in the current image, the macro blocks of the face part will be identified as high importance, the macro blocks of the body part will be identified as medium importance, and the macro blocks of the background part will be identified as low importance.

In block 307, the labeling module 107 ranks the macro blocks from high to low according to the assigned importance and labels each macro block with an label x, where x is a positive integer from 1 to N. The x indicates in which frame the macro block will be intra-coded.

In one embodiment, the labeling module 107 assigns the M macro blocks into N frames on an average basis, where the number of macro blocks in each frame is M/N, and the label x of each macro block is the number of the corresponding frame.

In another embodiment, the labeling module 107 estimates size of the encoded macro block and compares with the maximum allowable transmit threshold, calculates the number of macro blocks in each frame, then divides all the macro blocks into individual frames.

Figure 4:
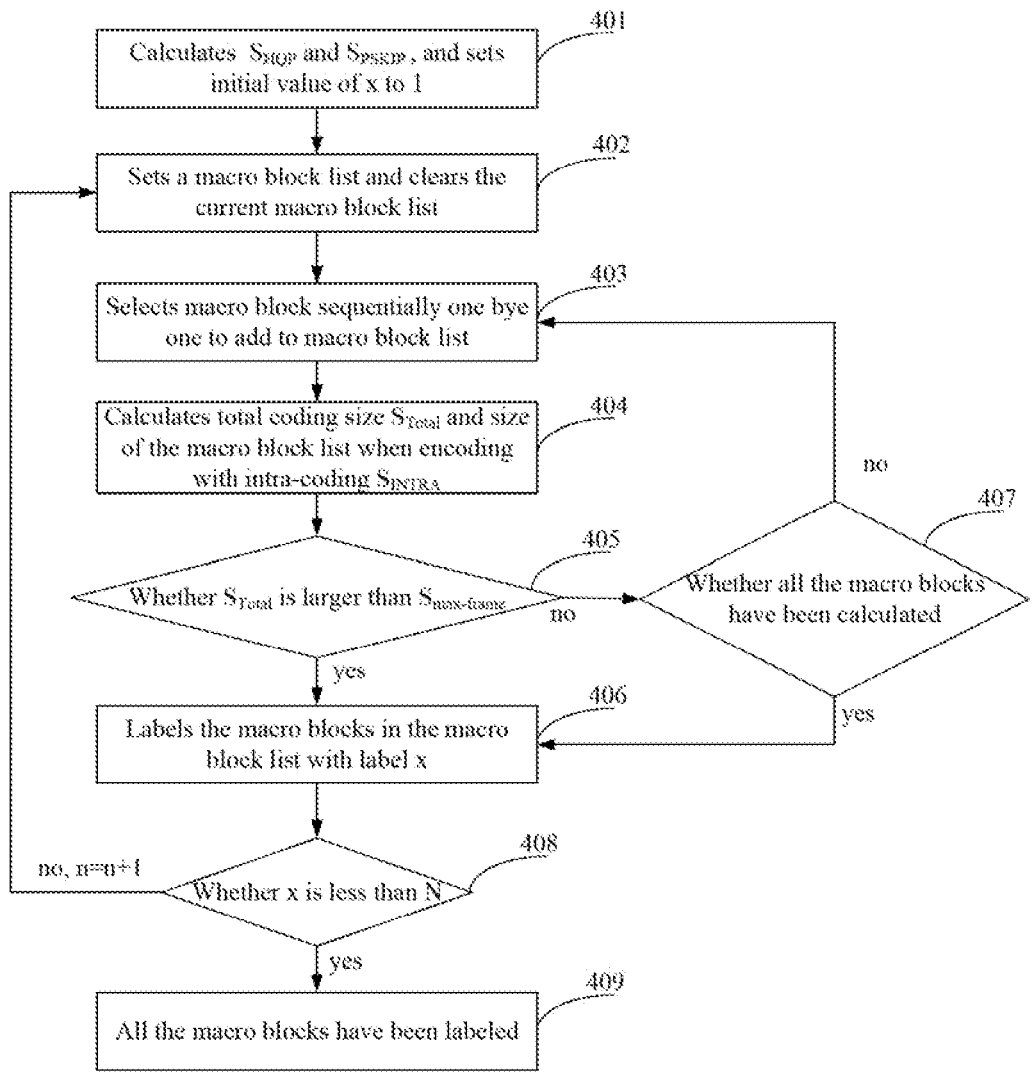
FIG. 4 is a flowchart of one embodiment of labeling macro blocks in a method for video coding.

FIG. 4 shows a flowchart of one embodiment of labeling macro blocks in a method for video coding. In block 401, the labeling module 107 calculates size of the current image when encoding with a high QP value $S_{HQP}$ and size of the current image when encoding with inter-coding $S_{PSKIP}$, and sets the initial value of x to 1. In the present embodiment, the high QP value can be between 22-51.

In block 402, the labeling module 107 sets macro block list, and the initial macro block list is empty.

In block 403, the labeling module 107 selects macro block sequentially one by one to add to macro block list according to the sequence in block 307.

In block 404, the labeling module 107 calculates total coding size $S_{Total}$ of the macro block list and size of the macro block list when encoding with intra-coding $S_{INTRA}$. In the present embodiment, when x=1, $S_{Total}=[1-(C_{mb-list}/C_{mb-total})]*S_{HQP}+S_{INTRA}$. When x is larger than 1, $S_{Total}=[1-(C_{mb-list}/C_{mb-total})]*S_{PSKIP}+S_{INTRA}$, wherein $C_{mb-list}$ is a number of list macro block list and $C_{mb-total}$ is i a number of all of the macro blocks.

In block 405, the labeling module 107 compares the $S_{Total}$ with the $S_{max-frame}$. When $S_{Total}$ is less than $S_{max-frame}$ it indicates that the macro block list is able to add more macro blocks, and the process proceeds to block 407. In block 407, the labeling module 107 determines whether all the macro blocks have been calculated, and if not, adds another macro block to the macro block list and calculates the $S_{Total}$ again. When $S_{Total}$ is larger than $S_{max-frame}$, it indicates that the size of macro block list has exceeded the maximum allowable transmit threshold, and the process proceeds to block 406.

In block 406, the labeling module 107 labels the macro blocks in the macro block list with label x. In the present embodiment, labeling with an x indicates that the macro blocks so labeled will be intra-coding in the frame x, where x is a positive integer from 1 to N.

In block 408, the labeling module 107 compares x with N. If x is less than N, it indicates that there are other macro blocks needing to be labeled, then label x plus one can be applied, and the process proceeds to block 402. The labeling module 107 clears the macro block list and selects the remaining macro blocks sequentially one by one to add to macro block list.

In block 409, when x is equal to N, it indicates that all the macro blocks have been labeled.

Through the above blocks, the labeling module 107 will apply label x to all of the macro blocks.

In block 309, the encoding module 109 encodes the current image. The encoding module 109 encodes the macro blocks which have a label x equaling 1 with low QP value and intra-coding and the macro blocks with label x which is greater than 1 with high QP value and intra-coded to form a first frame. Moreover, the encoding module 109 encodes the macro blocks with a label x which is less than n with inter-coding to form an $n^{th}$ frame, where n is a positive integer from 2 to N. In the present embodiment, the high QP value can be between 22-51, and the low QP value can be between 0-24, and the QP value can be set according to the actual environment.

Figure 5:
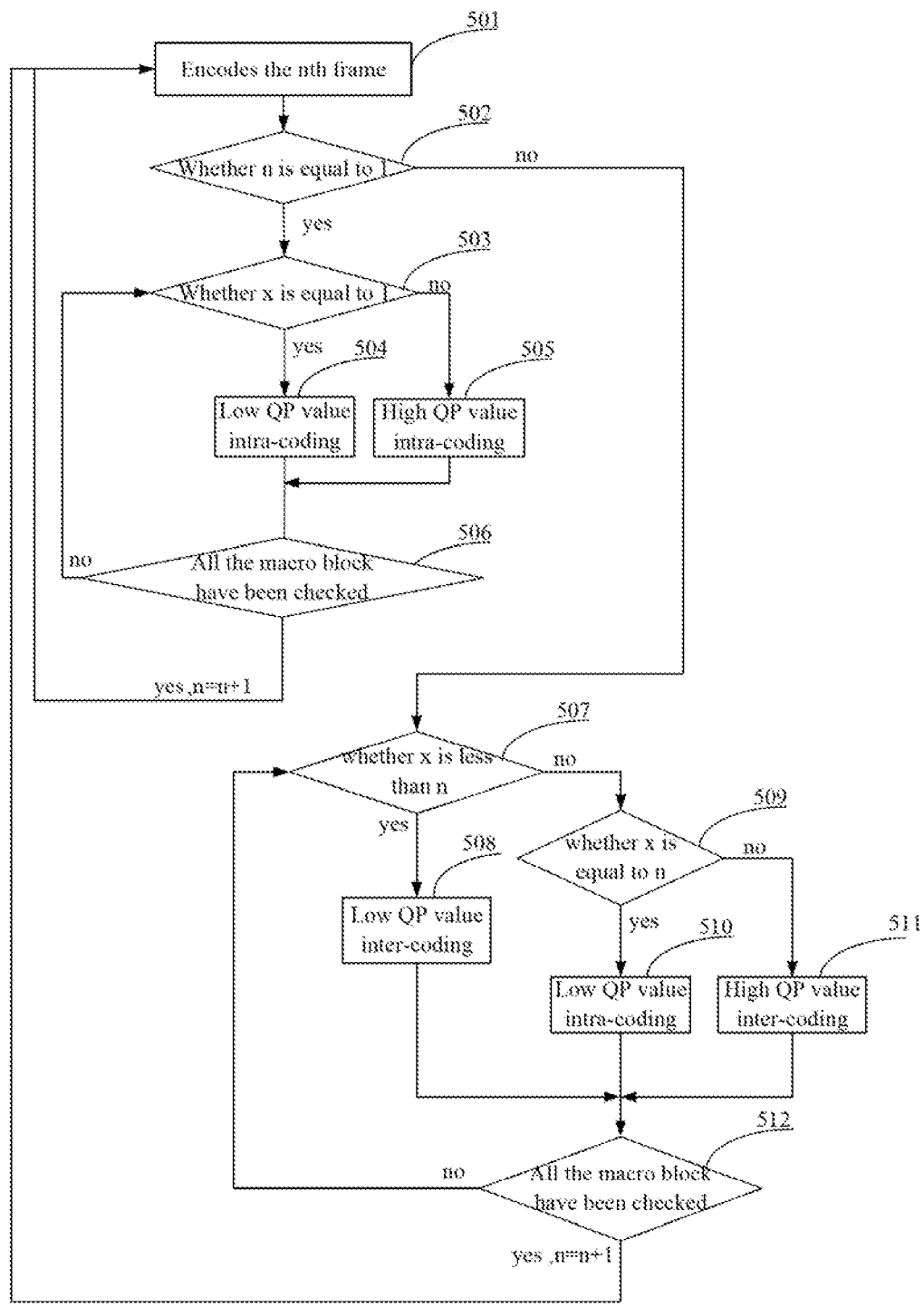
FIG. 5 is a flowchart of one embodiment of encoding macro blocks in a method for video coding.

FIG. 5 is a flowchart of one embodiment of encoding macro blocks in a method for video coding. In block 501, the encoding module 109 encodes the $n^{th}$ frame.

In block 502, the encoding module 109 determines whether n is equal to 1. When n is equal to 1, it indicates that the $n^{th}$ frame is encoded in intra-coding and the process proceeds to block 503, otherwise proceeding to block 507.

In block 503, the encoding module 109 determines whether the label x of each macro block is equal to 1. When the label x is equal to 1, it indicates that the macro block is high importance, and it will be encoded with low QP value and intra-coding in block 504, otherwise it will be encoded with high QP value and intra-coding in block 505.

In block 506, the encoding module 109 determines whether all of the macro blocks have been processed. If some macro blocks remain to be analyzed, the process proceeds to block 503, otherwise the process proceeds to block 501.

In block 507, the encoding module 109 determines whether the label x of each macro block is less than n. When the label x is less than n, the encoding module 109 encodes the macro block with low QP value and inter-coding. Otherwise, the process proceeds to block 509.

In block 509, the encoding module 109 determines whether the label x of each macro block is equal to n. When the label x is equal to n, the encoding module 109 encodes the macro block with low QP value and intra-coding in block 510. When the label x is larger than n, the encoding module 109 encodes the macro block with high QP value and inter-coding.

In block 512, the encoding module 109 determines whether all the macro block have been analyzed. If there some macro blocks remaining to be analyzed, the process proceeds to block 507, otherwise it proceeds to block 501.

The device and the method for video encoding can calculates the number of frames into which the current image needs to be dispersed, identifies importance of the parts of current image, and encodes the current image with different coding. This not only reduces the size of the I-frame, but also ensures the video quality.

Many details are often found in the art such as the other features of video encoding. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A video encoding device, comprising:
   at least one processor;
   a storage system; and
   one or more programs stored in the storage system and executed by the at least one processor, and the one or more programs comprising instructions for:
   determining whether to encode a current image into I-frame;
   calculating N dispersed frames upon condition that the current image will be encoded into I-frame, wherein N is a positive integer starting at one;
   dividing the current image into M macro blocks, and identifying importance of the M macro blocks according to a content of the current image, wherein M is a positive integer starting at one;
   ranking the M macro blocks from high to low according to the importance, and labeling each macro block with a label x, wherein the label x is a positive integer from 1 to N;
   encoding the macro blocks whose label x equals 1 with a low QP value and an intra-coding and encoding the macro blocks whose label x is greater than 1 with a high QP value and an intra-coded to form a first frame; and
   encoding the macro blocks whose label x is less than n with the inter-coding to form a $n^{th}$ frame, wherein n is a positive integer from 2 to N,
   wherein labeling each macro block with the label x comprising:
   selecting part of all macro blocks sequentially one by one to add to a macro block list, calculating total coding size $S_{Total}$ of the macro block list until the total size $S_{Total}$ is larger than $S_{max\text{-}frame}$, and labeling the macro blocks in the macro block list with label 1, wherein the $S_{max\text{-}frame}$ is the maximum allowable transmit threshold of network transmission channel, wherein $S_{Total}=[1-(C_{mb\text{-}list}/C_{mb\text{-}total})]*S_{HQP}+S_{INTRA}$, $C_{mb\text{-}list}$ is a number of list macro block list, $C_{mb\text{-}total}$ is a number of all of the macro blocks, $S_{HQP}$ is a size of the current image when encoding with a high QP value, $S_{INTRA}$ is a size of the macro block list when encoding with the intra-coding; and
   clearing the macro block list and selecting the rest of all macro block sequentially one by one to add to the macro block list, calculating a total coding size $S'_{Total}$ of the macro block list, until the total size $S'_{Total}$ is larger than $S_{max\text{-}frame}$, and labeling the macro blocks in the macro block list with the label x, wherein $S'_{Total}=[1-(C_{mb\text{-}list}/C_{mb\text{-}total})]*S_{PSKIP}+S_{INTRA}$, wherein $S_{PSKIP}$ is a size of the current image when encoding with the inter-coding.

2. The video encoding device as claimed in claim 1, wherein dividing the current image into M macro blocks comprises: dividing the current image into M macro blocks with 8×8 or 16×16 mode.

3. The video encoding device as claimed in claim 1, wherein ranking the M macro blocks from high to low according to the importance, labeling each macro block with the label x comprises:
   assigning the M macro blocks into N frames averagely, wherein the number of macro blocks in each frame is M/N, and the label x of each macro block is the number of corresponding frame.

4. The video encoding device as claimed in claim 1, wherein encoding the macro blocks to form a $n^{th}$ frame comprises:
   encoding the macro blocks with a low QP value and the encoding way is intra-coding when the label x of the macro blocks equals n; and
   encoding the macro blocks with a high QP value and the encoding way is inter-coded when the label x of the macro blocks is greater than n.

5. The video encoding device as claimed in claim 1, wherein calculating number N of dispersed frames upon condition that the current image will be encoded into I frame comprises: calculating number N of dispersed frames according to the maximum allowable transmit threshold $S_{max\text{-}frame}$ of network transmission channel.

6. A method for video coding, comprising:
   determining whether to encode a current image into I frame;
   calculating N dispersed frames upon condition that the current image will be encoded into I frame, wherein N is a positive integer starting at one;
   dividing the current image into M macro blocks, and identifying importance of the M macro blocks according to a content of the current image, wherein M is a positive integer starting at one;
   ranking the M macro blocks from high to low according to the importance, labeling each macro block with a label x, wherein the label x is a positive integer from 1 to N;
   encoding the macro blocks whose label x equals 1 with a low QP value and an intra-coding and encoding the macro blocks whose label x is greater than 1 with a high QP value and an intra-coded to form a first frame; and
   encoding the macro blocks whose label x is less than n with inter-coding to form a $n^{th}$ frame, wherein i is a positive integer from 2 to N,
   wherein labeling each macro block with the label x comprising:
   selecting part of all macro blocks sequentially one by one to add to a macro block list, calculating a total coding size $S_{Total}$ of the macro block list, until the total size $S_{Total}$ is larger than $S_{max\text{-}frame}$, and labeling the macro blocks in the macro block list with label 1, wherein $S_{Total}=[1-(C_{mb\text{-}list}/C_{mb\text{-}total})]*S_{HQP}+S_{INTRA}$, $C_{mb\text{-}list}$ is a number of list macro block list, $C_{mb\text{-}total}$ is a number of all of the macro blocks, $S_{HQP}$ is a size of the current image when encoding with a high QP value, $S_{INTRA}$ is a size of the macro block list when encoding with the intra-coding; and
   clearing the macro block list and selecting the rest of all macro block sequentially one by one to add to the macro block list, calculating a total coding size $S'_{Total}$ of the macro block list, until the total size $S_{Total}$ is larger than $S_{max\text{-}frame}$, and labeling the macro blocks in the macro block list with label x, wherein $S'_{Total}=[1-(C_{mb\text{-}list}/C_{mb\text{-}total})]*S_{PSKIP}+S_{INTRA}$, wherein $S_{PSKIP}$ is a size of the current image when encoding with the inter-coding,
   wherein the $S_{max\text{-}frame}$ is the maximum allowable transmit threshold of network transmission channel.

7. The method as claimed in claim 6, wherein dividing the current image into M macro blocks further comprises: dividing the current image into M macro blocks with 8×8 or 16×16 mode.

8. The method as claimed in claim 6, wherein ranking the M macro blocks from high to low according to the importance, labeling each macro block with the label x further comprises:
   assigning the M macro blocks into N frames averagely, wherein the number of macro blocks in each frame is M/N, and the label x of each macro block is the number of corresponding frame.

9. The method as claimed in claim 6, wherein encoding the macro blocks to form a $n^{th}$ frame further comprises:
   encoding the macro blocks with a low QP value and the encoding way is intra-coding when the label x of the macro blocks equals n; and
   encoding the macro blocks with a high QP value and the encoding way is inter-coded when the label x of the macro blocks is greater than n.

10. The method as claimed in claim 6, wherein calculating number N of dispersed frames upon condition that the current image will be encoded into I frame further comprises: calculating number N of dispersed frames according to the maximum allowable transmit threshold $S_{max\text{-}frame}$ of network transmission channel.

* * * * *